United States Patent
Kumar et al.

(10) Patent No.: US 9,363,138 B1
(45) Date of Patent: Jun. 7, 2016

(54) BRIDGING COMMUNICATIONS

(71) Applicant: Sprint Communications Company L.P., Overland Park, KS (US)

(72) Inventors: Rajat Kumar, Kansas City, MO (US); Talat Jamshidi, Leawood, KS (US); Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 175 days.

(21) Appl. No.: 14/013,432

(22) Filed: Aug. 29, 2013

(51) Int. Cl.
*H04W 24/04* (2009.01)
*H04L 12/24* (2006.01)
*H04W 88/16* (2009.01)

(52) U.S. Cl.
CPC ........... *H04L 41/0659* (2013.01); *H04W 24/04* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 2007/0258360 | A1* | 11/2007 | Senga et al. | 370/218 |
| 2010/0304736 | A1* | 12/2010 | Konda et al. | 455/424 |
| 2012/0134259 | A1* | 5/2012 | Bonnier et al. | 370/221 |
| 2012/0300620 | A1* | 11/2012 | Kothari et al. | 370/225 |
| 2013/0003534 | A1* | 1/2013 | Henry et al. | 370/228 |
| 2013/0346788 | A1* | 12/2013 | Haddad et al. | 714/4.2 |

* cited by examiner

*Primary Examiner* — Robert M Morlan

(57) ABSTRACT

Systems, methods, and computer-readable media for bridging communications are provided. Interfaces between multiple high speed gateways exist but are only capable of use during handovers between varying cell towers, are manually configured, and only communicate signaling information. A bridging interface that is automatically created between two or more high speed gateways during a failed communications link is described. The bridging interface is capable of communicating both signal and data information and is associated with a single cell tower. The bridging interface may be utilized during the communications link such that a user experience is not negatively impacted.

20 Claims, 4 Drawing Sheets

BRIDGING COMMUNICATIONS

BRIEF SUMMARY

A high-level overview of various aspects of the invention is provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, bridging communications. In particular, communication links in telecommunications networks may be bridged when communications links fail. Communication links may fail for various reasons. For example, routing issues, interface issues, and the like may cause a failed communication link. When this happens, a user experience is negatively affected as user is not able to regain full service until the communication link is restored.

BRIEF DESCRIPTION OF THE DRAWINGS

Illustrative embodiments of the present invention are described in detail below with reference to the attached drawing figures, and wherein.

DETAILED DESCRIPTION

Figure 1:
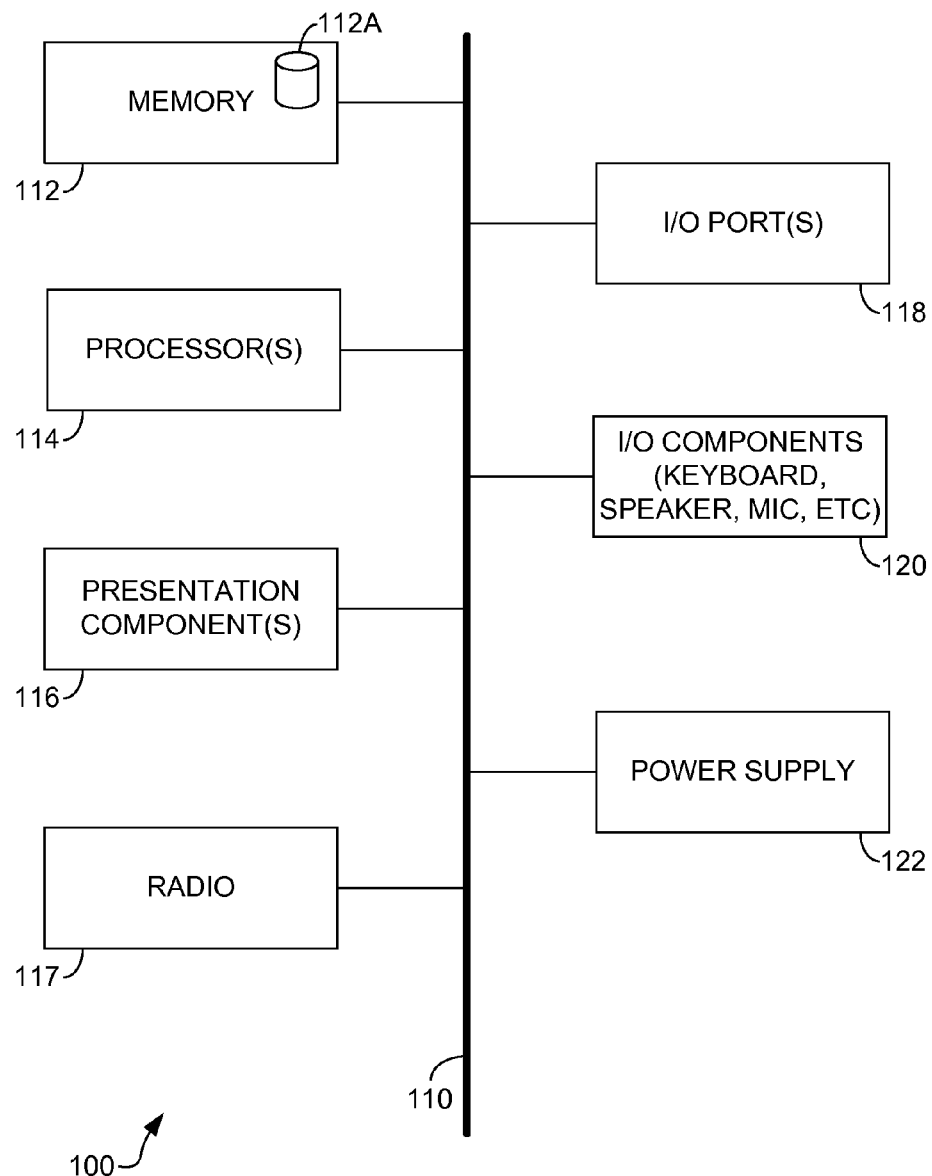
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention may be embodied as, among other things, a method, a system, or set of instructions embodied on one or more computer-readable media. As mentioned, embodiments of the present invention are directed toward bridging communications. In particular, communication links in telecommunications networks may be bridged when communication links fail. Communication links may fail for various reasons. For example, routing issues, interface issues, and the like may cause a failed communications link. When this happens, a user experience is negatively affected as user is not able to regain full service until the communication link is restored.

Accordingly, in one aspect, the present invention is directed to a method for bridging communications. The method includes identifying a failed communications link between a first gateway and a second gateway of a telecommunications system, bridging the first gateway and the second gateway with a replacement gateway, communicating any data that is to be communicated from the first gateway to the second gateway to the replacement gateway such that data is communicated to the second gateway from the replacement gateway, identifying a reestablished communications link between the first gateway and the second gateway, ceasing communication of data from the first gateway to the replacement gateway, and resuming communication of data from the first gateway to the second gateway.

In yet another aspect, a system for bridging communications is provided. The system includes a computing device associated with one or more processors and one or more computer storage media and a gateway manager for bridging communications between a plurality of gateways. The gateway manager includes an identifying component for identifying a connectivity status between a first gateway and a second gateway, and a bridging component for bridging communications between the first gateway and the second gateway via a replacement gateway.

In another aspect, embodiments of the present invention are directed to one or more computer-readable storage media having computer-executable instructions embodied thereon that, when executed, perform a method for bridging communications. The method includes identifying a failed communications link between a first gateway and a second gateway of a telecommunications system, bridging the first gateway and the second gateway with a replacement gateway, communicating any data that is to be communicated from the first gateway to the second gateway to the replacement gateway such that data is communicated to the second gateway from the replacement gateway, identifying a reestablished communications link between the first gateway and the second gateway, ceasing communication of data from the first gateway to the replacement gateway, and resuming communication of data from the first gateway to the second gateway.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third Generation Mobile Telecommunications |
| 4G | Fourth Generation Mobile Telecommunications |
| CD-ROM | Compact Disk Read Only Memory |
| CDMA | Code Division Multiple Access |
| GPRS | General Packet Radio Service |
| GSM | Global System for Mobile communications: originally from Groupe Spécial Mobile |
| DVD | Digital Versatile Discs |
| EEPROM | Electrically Erasable Programmable Read Only Memory |
| HSGW | High Speed Gateway |
| HLR | Home Location Register |
| HSDPA | High-Speed Downlink Packet Access |
| LTE | Long Term Evolution |
| PA | Power Amplifier |
| PC | Personal Computer |
| PDA | Personal Digital Assistant |
| PGW | Packet Gateway |
| RAM | Random Access Memory |
| ROM | Read Only Memory |
| SGW | Serving Gateway |
| TDMA | Time Division Multiple Access |

-continued

| | |
|---|---|
| UMTS | Universal Mobile Telecommunications System |
| VOIP | Voice Over Internet Protocol |
| VoLTE | Voice Over LTE |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for bridging communications. In particular, communication links in telecommunications networks may be bridged when communications links fail. Communication links may fail for various reasons. For example, routing issues, interface issues, and the like may cause a failed communication link. When this happens, a user experience is negatively affected as user is not able to regain full service until the communication link is restored.

In a particular example, a communication link may fail between a high speed gateway (HSGW) and a packet gateway (PGW). This embodiment will be discussed in detail below. For now, simply assume the communication link between the HSGW and PGW is down. When this happens, a user is not able to complete data transfers between the HSGW and PGW, which results in a delay in service. Another HSGW may be utilized to replace the failed HSGW so that a user can continue with their experience.

Figure 2:
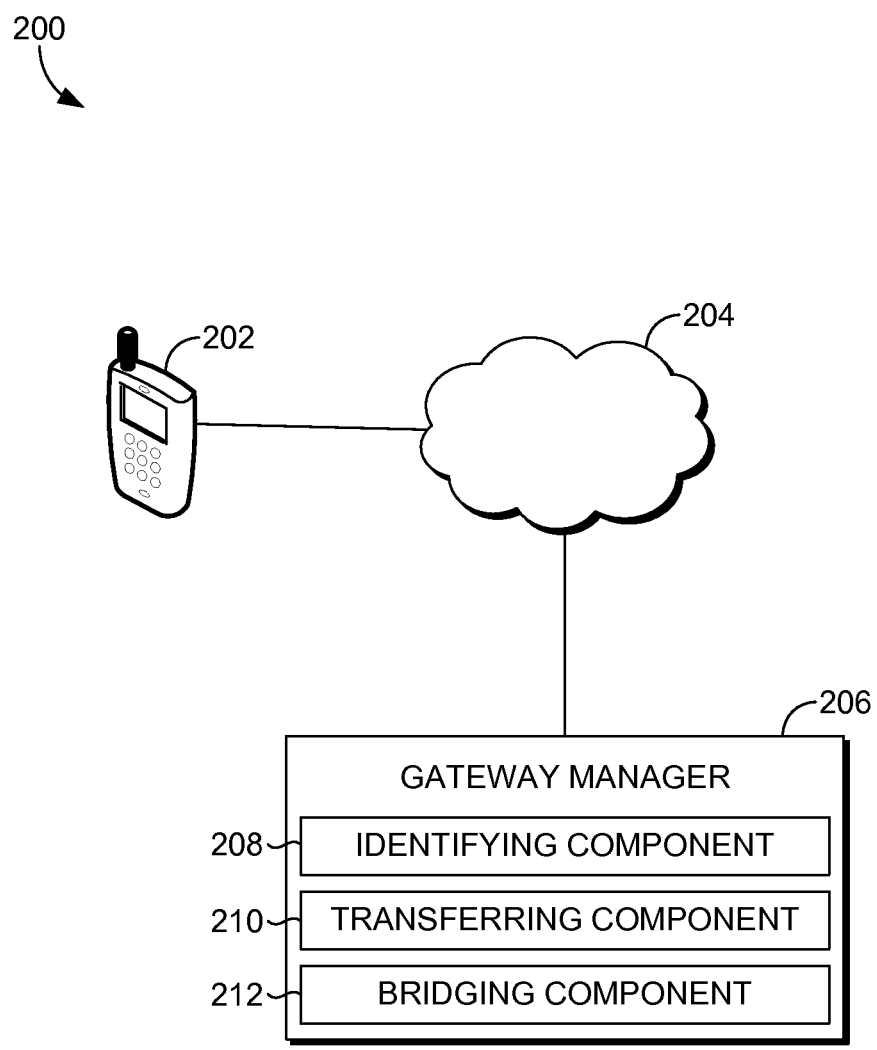
FIG. 2 depicts an illustrative operating system for carrying out embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment 200 be interpreted as having any dependency or requirement relating to any one or combination of components illustrated.

In the network environment 200, one or more user devices 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize network 204 to communicate with other computing devices (e.g., a mobile device(s), a server(s), a personal computer(s), etc.). In embodiments, network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. Network 204 can be part of a telecommunications network that connects subscribers to their immediate service provider. In embodiments, network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112 of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

The network environment 200 also includes a gateway manager 206. The gateway manager 206 is configured to bridge communications in a telecommunications network. The gateway manager 206 may be a stand-alone component or may be integrated into any component of the network 204 such as, for example, a HSGW, a PGW, a serving gateway (S-GW), and the like. Additionally, multiple components of network 204 may be associated with the gateway manager 206 or may include their own gateway manager 206.

The gateway manager 206 includes an identifying component 208, a transferring component 210, and a bridging component 212. The identifying component 208 is configured for, among other things, identifying a connection status or a failed communications link. A communications link, as used herein, refers generally to an indication that connectivity has been lost. The identifying component 208 may continuously monitor connectivity of a telecommunications system (and all components thereof) or may be manually triggered to check connectivity of a system. The identifying component 208 may identify a failed communications link based on criteria desired by an administrator. For example, a failed communications link may be identified by an increase in the loss of data communicated between two components (or more), an increase in unsuccessful data transfers, an identification of a single unsuccessful data transfer, or the like. In an embodiment, the identifying component 208 is configured to identify an unsuccessful data transfer between an HSGW and a PGW (i.e., the s2a interface).

The transferring component 210 is configured for, among other things, transferring traffic during a failed communications link. In particular, traffic that would otherwise be routed through the failed communications link is rerouted to another path. Additionally, data that was to be transferred via the failed communications link is rerouted to another path. The other path may be a "bridge" between the components of the failed communications link. For instance, a first gateway (e.g., a HSGW) and a second gateway (e.g., a PGW) may suffer a failed communications link. A "bridge" may be established to facilitate a replacement link until the failed communication link is restored. This bridge may be established by, for example, the bridging component 212 of FIG. 2.

Once the bridge is established (by, for example, the bridging component 212) traffic that would have originally been routed from a first gateway to a second gateway (i.e., the failed communications link) is rerouted via the bridge such that it arrives to the second gateway via the bridge.

In the example where the failed communications link is between a HSGW and a PGW, a replacement HSGW may be identified. The replacement HSGW may be identified by querying neighboring HSGW's in order to identify HSGW's having a connection with the PGW associated with the failed communications link. A bridge between the failed HSGW and the replacement HSGW may be established. Interfaces between HSGW's have been previously established but are quite different from the present invention as they were only used for handovers from one cell tower to another. The present invention creates a new bridge (interface) that is capable of transferring both signal and data. Thus, both voice calls and data activity in a telecommunications network may be communicated via a HSGW bridge. Additionally, the bridge created here is for use within a single cell tower. Thus, the user device, such as user device 202, is associated with the same cell tower during use of the bridge. Lastly, the interfaces between HSGW's for handovers were manually configured while the present bridge communications link is automatically configured upon identifying a failed communications link. Furthermore, since the bridge is configured automatically, the HSGW's are capable of identifying a nearest neighboring HSGW on their own rather than with a manual identification.

In an alternative embodiment, the HSGW of the failed communications link may identify a neighboring HSGW that has an existing connection with the PGW of the failed communications link. Alternatively, the HSGW of the failed communications link may identify a neighboring HSGW that does not yet have an existing connection with the PGW of the failed communications, but is capable of establishing a connection with the same PGW.

Once the bridge is established for one user it is applied to other users that have sessions bound to the same PGW until the failed communications link is restored. In other words, until the failed communications link is restored a replacement gateway facilitates communication with the PGW of the failed communications link.

Several advantages exist for bridging communication links in this manner. Customer experiences are improved as the user experiences a lower amount of down time in link failure scenarios, networks are more robust in the case of outages, the user is unaware of the newly created bridge so the user experience is likely not negatively impacted, and the like. Additionally, telecommunications networks appear to be moving toward Self Organizing Networks (SONs) so automatic creation of bridges is closer to the self-healing aspect of SONs.

Figure 3:
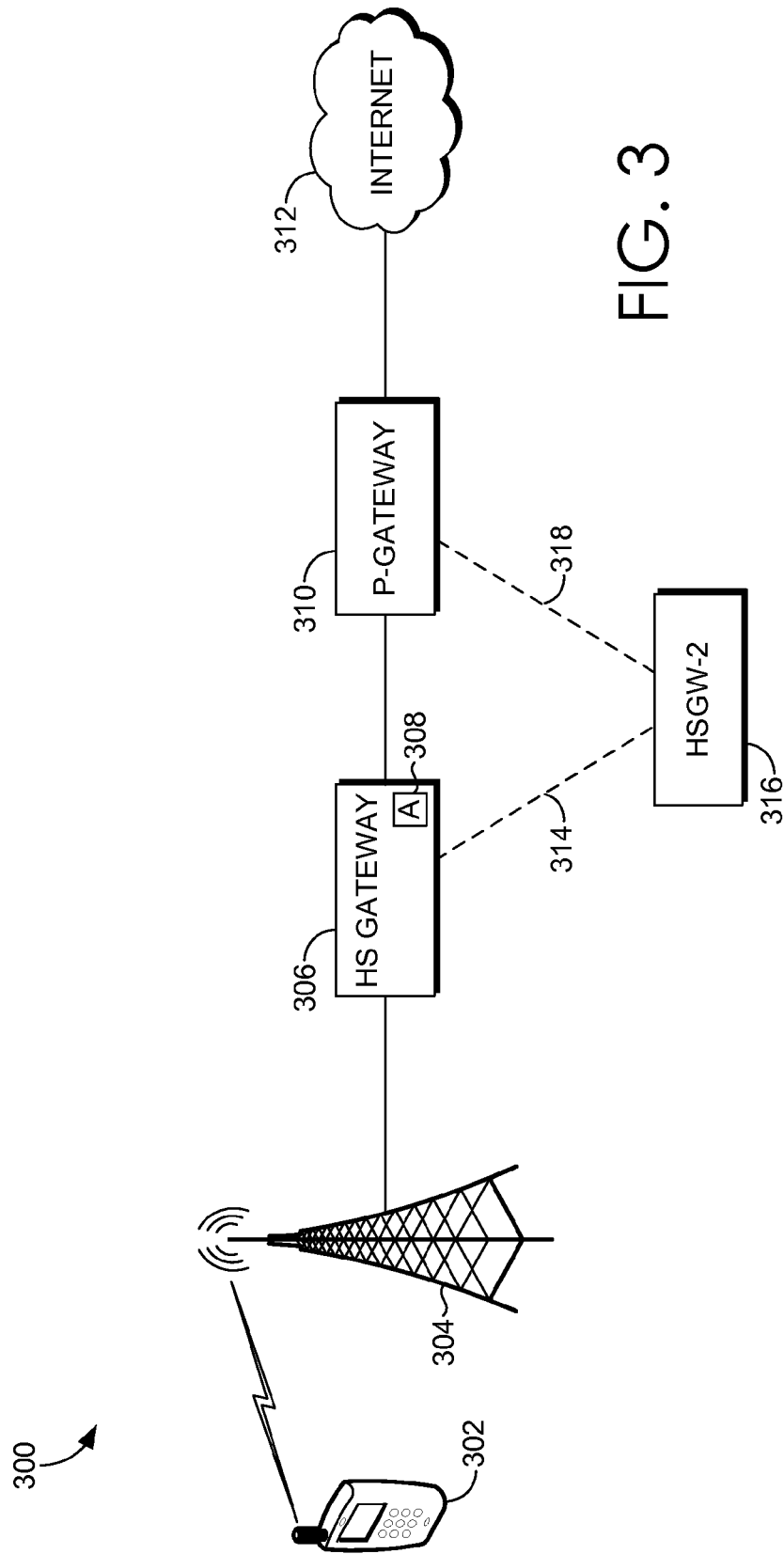
FIG. 3 depicts an illustrative operating system for carrying out embodiments of the present invention.

FIG. 3 provides a specific telecommunications environment 300 in which the present invention may be applied. In application, a user device 302 is associated with a specific cell tower 304 of the telecommunications environment 300. In the case of data transfer, a variety of components are part of a path from the user device 302 to a data source such as the internet 312. For instance, data typically travels via a HSGW 306 to a PGW 310 to the internet 312. The HSGW 306 may be configured to include a gateway manager 308 such as the gateway manager 206 of FIG. 2. In a specific embodiment, the communications link between HSGW 308 and PGW 310 fails. Thus, a replacement HSGW is desired to bridge the path between the HSGW 308 and the PGW 310.

The HSGW 308 of the failed communications link may identify a neighboring HSGW that is already connected to the PGW 310 or a neighboring HSGW that is capable of establishing a connection to the PGW 310. As illustrated in FIG. 3, a neighboring HSGW has been identified as a replacement HSGW-2 316. A bridge 314 is established between the HSGW 308 of the failed communications link and the replacement HSGW-2 316. The replacement HSGW-2 316 is connected to the PGW 310 via communications link 318. Communications link 318 may have already existed at the time of creation of the bridge 314 or it may have been created subsequent to the creation of the bridge 314. A connection to the same PGW (in this case, PGW 310) is desirable because each PGW is associated with a pool of Internet Protocol (IP) addresses. An IP address is associated with each session bound to the PGW. Thus, if a different PGW were used, a new IP address would have to be assigned to the incoming session and a user's existing session with the previous PGW will be terminated. In that case, a user would be aware that their session was terminated and down time would increase.

Once the communications link between HSGW 306 and PGW 310 is reestablished, the bridge 314 may no longer be used. Thus, HSGW 306 may immediately begin communicating with PGW 310 again such that replacement HSGW-2 316 is not used as an intermediate any longer. Alternatively, replacement HSGW-2 316 may continue to be used for the remainder of sessions that were already transferred to it so that they are not transferred back to HSGW 306 during the session but, rather, will be transferred back to HSGW 306 once the session is terminated.

The bridging concept discussed could be applied in a 3G telecommunications network (as discussed hereinabove) or a 4G telecommunications network. In a 4G network, for example, a failed communications link may be identified between a serving gateway (S-GW) and the PGW (rather than between the HSGW and PGW). As in the 3G network, the S-GW may identify a neighboring S-GW to act as a replacement S-GW during the communication link failure. In that situation, a bridge may be created between the S-GW of the failed communications link and a replacement S-GW. As with the replacement HSGW, the replacement S-GW may already be connected to the PGW of the failed communications link or may be capable of connecting to the same PGW. Again, as with the 3G network, the S-GW is configured to automatically create a bridge in the case of failed communication links, just like the HSGW automatically forms the bridge in the 3G network.

Figure 4:
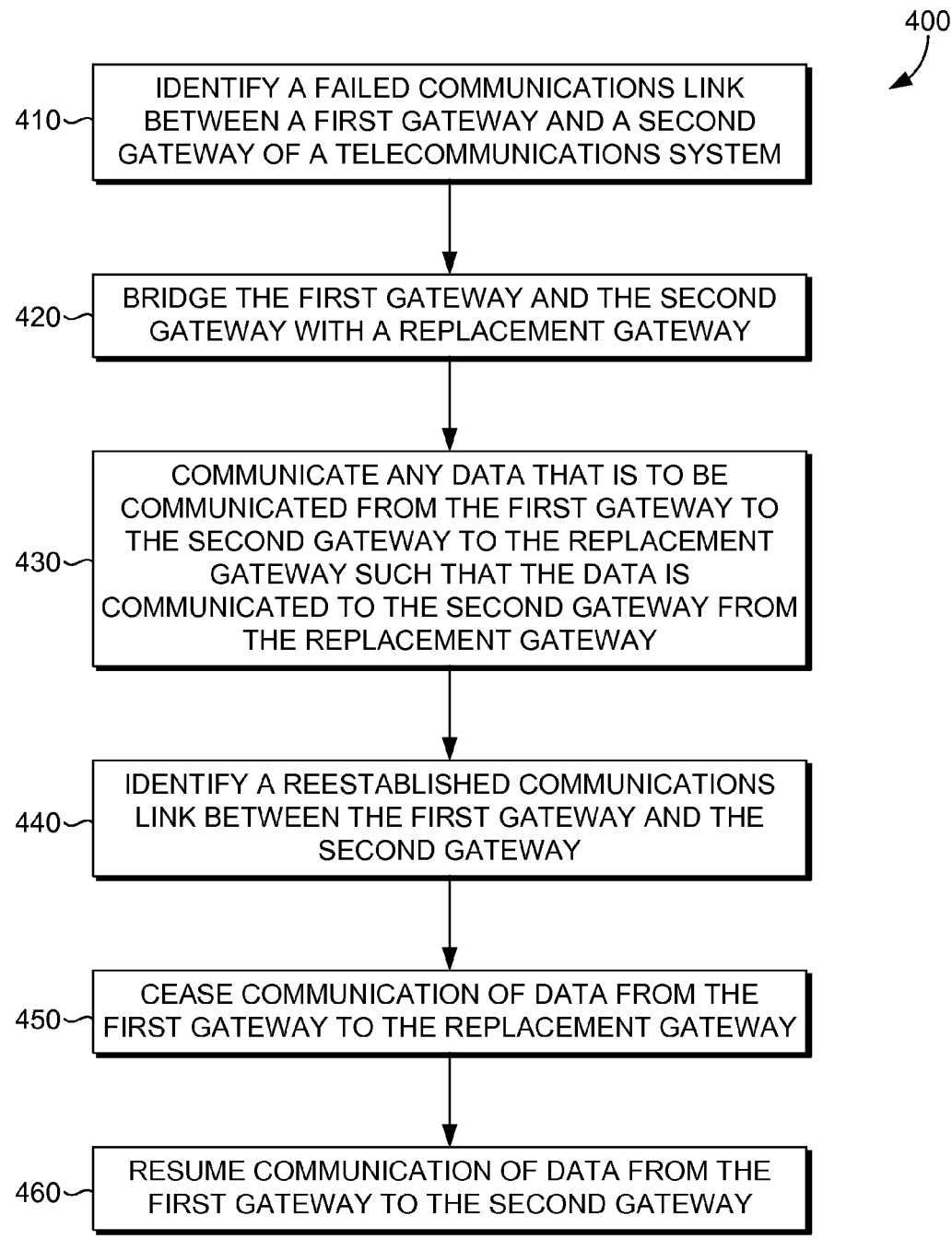
FIG. 4 provides an exemplary method for bridging communications, in accordance with an embodiment of the present invention.

Turning now to FIG. 4, a flow diagram is shown illustrating a first exemplary method 400 for bridging communications in accordance with an embodiment of the present invention. Initially, at block 410, a failed communications link is identified between a first gateway and a second gateway of a telecommunications system. A bridge is created between the first gateway and the second gateway via a replacement gateway at block 420. Any data that was to be communicated from the first gateway to the second gateway is transferred to the replacement gateway such that the data is communicated to the second gateway from the replacement gateway at block 430. At block 440 it is identified that the communications link between the first gateway and the second gateway has been reestablished. Communication of data from the first gateway to the replacement gateway is ceased at block 450 and communication of data from the first gateway to the second gateway resumes at block 460.

It will be understood by those of ordinary skill in the art that the order of steps shown in the method 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for bridging communications, the method comprising:
   for an individual cell tower:
   identifying a failed communications link between a first high speed gateway and a second packet gateway of a telecommunications system;
   bridging the first high speed gateway and the second packet gateway with a replacement gateway;
   communicating any data that is to be communicated from the first high speed gateway to the second packet gateway to the replacement gateway such that the data is communicated to the second packet gateway from the replacement gateway;
   identifying a reestablished communications link between the first high speed gateway and the second packet gateway;
   ceasing communication of data from the first high speed gateway to the replacement gateway;
   and resuming communication of data from the first high speed gateway to the second packet gateway.

2. The method of claim 1, wherein the replacement gateway has an existing connection with the second packet gateway.

3. The method of claim 1, wherein the replacement gateway creates a connection with the second packet gateway upon being identified as the replacement gateway to bridge the first high speed gateway and the second packet gateway.

4. The method of claim 1, wherein the telecommunications system is a third generation (3G) telecommunications network.

5. The method of claim 1, wherein the telecommunications system is a fourth generation (4G) telecommunications network.

6. The method of claim 1, wherein the failed communications link indicates a loss of connectivity.

7. The method of claim 1, wherein the replacement gateway is a high speed gateway or a serving gateway.

8. The method of claim 1, wherein the first high speed gateway is configured to perform identification of the failed communications link.

9. A system for bridging communications in a telecommunications network, the system comprising:
   for an individual cell tower: a computing device associated with one or more processors and one or more computer storage media;
   and a gateway manager for bridging communications between a plurality of gateways, wherein the gateway manager comprises:
   an identifying component for identifying a connectivity status between a first high speed gateway and a second packet gateway, and a bridging component for bridging communications between the first high speed gateway and the second packet gateway via a replacement gateway.

10. The system of claim 9, wherein the telecommunications network is a third generation (3G) telecommunications network.

11. The system of claim 9, wherein the telecommunications network is a fourth generation (4G) telecommunications network.

12. The system of claim 9, wherein the replacement gateway has an existing connection with the second packet gateway.

13. The system of claim 9, wherein the replacement gateway creates a connection with the second packet gateway upon being identified as the replacement gateway to bridge the first high speed gateway and the second packet gateway.

14. The method of claim 9, wherein the gateway manager for bridging communications between a plurality of gateways is integrated with the first high speed gateway.

15. The system of claim 9, wherein the bridging component is configured to generate a new interface that transfers signal and data via the replacement gateway.

16. The system of claim 9, wherein the bridging component is automatically configured to maintain an association of a user device with the individual cell tower during use of a bridge communications link via the replacement gateway.

17. One or more non-transitory computer-readable storage media having computer-executable instructions embodied thereon that, when executed, perform a method for bridging communications, the method comprising:
   for an individual cell tower: identifying a failed communications link between a first high speed gateway and a second packet gateway of a telecommunications system;
   bridging the first high speed gateway and the second packet gateway with a replacement gateway;
   communicating any data that is to be communicated from the first high speed gateway to the second packet gateway to the replacement gateway such that the data is communicated to the second packet gateway from the replacement gateway;
   identifying a reestablished communications link between the first high speed gateway and the second packet gateway;
   ceasing communication of data from the first high speed gateway to the replacement gateway;
   and resuming communication of data from the first high speed gateway to the second packet gateway.

18. The media of claim 17, wherein identifying a failed communications link is based on criteria defined by an administrator, an increase in data loss between two components, or an increase in unsuccessful data transfers.

19. The media of claim 18, further comprising:
   upon bridging the first high speed gateway and the second packet gateway with a replacement gateway for a first user device, bridging the first high speed gateway and the second packet gateway with the replacement gateway for a second user device bound to the first high speed gateway.

20. The media of claim 17, further comprising:
   identifying a user device bound to the first high speed gateway and associated with a failed communications link; and
   maintaining the association of the user device with the individual cell tower during the bridging the first high speed gateway and the second gateway with a replacement gateway.

* * * * *